Oct. 17, 1944.   R. M. DEANESLY   2,360,655
DISTILLATION PROCESS
Filed Dec. 24, 1940
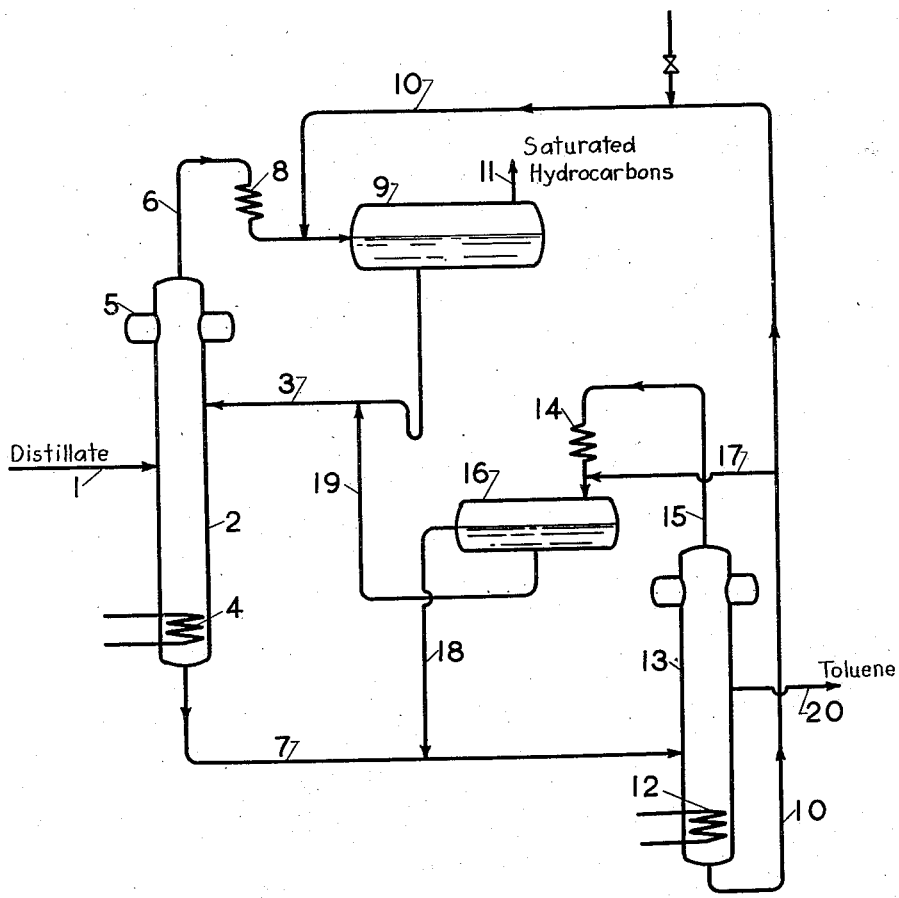
Inventor: Richard M. Deanesly
By his Attorney:

Patented Oct. 17, 1944

2,360,655

UNITED STATES PATENT OFFICE 2,360,655

DISTILLATION PROCESS

Richard M. Deanesly, Berkeley, Calif., assignor to Shell Development Company, San Francisco, Calif., a corporation of Delaware Application December 24, 1940, Serial No. 371,482

7 Claims. (Cl. 202—42)

This invention relates to an improved method of azeotropical distillation, and more particularly deals with an improvement in the separation by azeotropical distillation of distillable mixtures with solvents which are substantially miscible with the components of the mixture which form azeotropes with said solvents.

Azeotropical distillation with the aid of an added solvent is usually applied to the fractionation of distillable mixtures which for some reason cannot conveniently be separated by conventional fractional distillation. For example, the boiling temperature of the different components of the mixture may be too close together to allow proper fractionation with a reasonable number of fractionating stages, or some of the components of the mixture which one desires to separate from one another form low boiling azeotropes with each other, thus preventing their being separated. In carrying out azeotropical distillation, the azeotrope-forming solvent which should have a boiling temperature not too distant from the boiling temperature of the component to be taken overhead, is admixed either in the liquid or vapor state with a mixture to be separated, which mixture is then subjected to the distillation. Low boiling azeotropes of the solvent and some of the components of the mixtures are taken overhead, while other components which form higher boiling azeotropes or no azeotropes at all with the solvents are withdrawn as liquid residue. The amount of solvent introduced may be such that all of it goes overhead in the form of azeotropes, or it may be somewhat larger, in which case the excess of solvent is withdrawn in the liquid form, together with the distillation residue.

The usefulness of azeotrope-forming solvents is often greatly restricted by their property of being at least partially, if not completely, miscible with the component with which they form azeotropes, so that a separation of the solvent and said component from the resulting azeotrope is difficult to achieve. They cannot normally be separated by settling because they are miscible, and they cannot be separated by simple distillation because they form azeotropes. Where the miscibility is only partial, a subsequent redistillation of the separated phase produces on the one hand pure components, and on the other hand, azeotropes which again must be condensed, separated and redistilled; and where the miscibility is complete, a separation by simple distillation is totally impossible.

It is a purpose of this invention to modify azeotropical distillation so that solvents which are completely miscible with the azeotrope-forming component can be utilized; or that solvents which are at least partially miscible with the azeotrope-forming component can be utilized more effectively than has heretofore been possible.

My invention comprises azeotropically distilling distillable mixtures with a solvent forming azeotropes with a component of said mixture and being at least partially miscible therewith, to produce a vaporous azeotrope and a liquid bottom product, condensing the vapors and adding to the resulting condensate a demixing substance which is soluble in the solvent, but insoluble in the azeotrope-forming component of said mixture. The amount of the demixing substance should be such to effect at least partial insolubility between the solvents and azeotrope-forming component. As a result, the condensate forms two layers, one consisting of the azeotrope-forming component containing dissolved a more or less minor portion of the solvent, and the other being a solvent layer containing the added substance and usually a minor amount of the azeotrope-forming component. The solvent layer is returned to the zone of azeotropical distillation, while the other layer is redistilled to produce the purified component of the mixture and a relatively small amount of the azeotropic vapor mixture consisting of the solvent and said component.

For demixing purposes, I may use any substance which has the above solubility properties and is inert under the conditions of the distillation process. For practical reasons, I prefer one which is liquid under these conditions, although normally solid compounds may also be used. Further, they should not form secondary azeotropes with either the solvent or the component of the mixture going overhead or both. Instead, it is advantageous that the demixing agent flow down the distillation zone as a liquid, particularly if the demixing compound is one which has substantial solvent power for the components of the mixture to be separated, which components do not go overhead, i. e., form the distillation residue. To avoid formation of secondary azeotropes involving the demixing substance, it is therefore desirable that its boiling temperature be substantially higher, e. g., 50° C. or more than the boiling temperatures of the solvent or the azeotrope-forming component or both.

The bottom product of the distillation comprising the components of the mixture which do not form azeotropes or form azeotropes of relatively high boiling temperatures, contains the demixing agent and possibly some solvent. If the demixing agent is insoluble, it may be separated as by decantation. Otherwise, it may be separated by fractional distillation, whereupon it is returned to the zone of admixing it to the azeotrope condensate.

Suitability of various substances to serve as demixing agents depends on the composition of the mixture to be separated, the solvent employed in the distillation and the solubility relations between the several components of the azeotropic overhead mixture as explained above. Thus, for example, one may separate narrow boiling hydrocarbon mixtures containing two or more components of different degrees of saturation, such as a narrow gasoline or kerosene distillate containing, for example, paraffins, olefines, diolefines, aromatics, etc., with an agent forming lower boiling azeotropes with one component than with another, or forming azeotropes with some but not all of the components, such as ethyl alcohol, normal propyl alcohol, isopropyl alcohol, butyl alcohols; primary, secondary or tertiary methylamine, ethyl amines, propyl amines, butyl amines; acetone, methyl ethyl ketone, methyl propyl ketone, diethyl ketone, diethyl ether, dioxan, morpholine, piperidine, pyridine, piperazine, acetic acid, propionic acid, ethylene chlorhydrin, acetonitrile, propionitrile, phenol, aniline, nitrobenzene, etc. These agents are all more or less miscible with hydrocarbon oils, and therefore may require special means for separating them from the hydrocarbons with which they form azeotropes.

Suitable demixers for the condensates of these azeotropes are in particular high boiling polar organic liquids or solids having a high ratio of polar substitution radicals to carbon atoms, which ratio is preferably not below 2:3, preferred inorganic radicals being —OH, —O—, —NH$_2$, =NH, SH, =S, because of their stability. Examples of such demixers are ethylene glycol, propylene glycol, glycerine, methyl glycerine, glyceryl monomethyl ether, mono-, di- or triethanolamine, propanolamine, diaminohydroxypropanes or -butanes, dihydroxyaminopropanes or -butanes, diethylene glycol, triethylene glycol; diaminodiethyl ethers or thioethers, dihydroxydiethyl imino or thioethers; hydroxy amino diethyl ethers, imino ethers or thio ethers; dichlordiethyl ether, etc., urea, urethanes, carbazides, semicarbazides, carbazones, etc. Frequently inorganic or organic salts may be used, such as the chlorides, bromides, nitrates, formates, acetates, oxalates, tartrates, cyanides, thiocyanates, etc., of various metals, e. g., Li, Na, K, Ca, Zn, Sn, Sb, etc., alone or in combination with one or several organic demixers.

My improvement is also useful in the separation by azeotropical distillation of mixtures other than hydrocarbons, such as mixtures of phenols with thiophenols, hydrocarbons with alcohols, isomeric ethers, esters of similar boiling temperatures, acetic with formic or propionic acids, isomeric organic halides, petroleum bases; or in the desulfurization of hydrocarbon oils, etc.

My invention is illustrated by the attached drawing representing a simplified diagram of a preferred mode of operating my process. The mixture to be separated, such as a straight run petroleum distillate boiling from 98° C. to 120° C. (A. S. T. M.) and containing 17.8% toluene, is introduced as a vapor through line 1 from a source not shown into fractionating column 2. A solvent capable of forming low boiling azeotropes with paraffins, such as isopropyl alcohol, is admitted through line 3. Column 2 is equipped with reboiler 4 and partial condenser 5, and is operated in such a manner that azeotropes formed with saturated hydrocarbons only are withdrawn through vapor line 6, while toluene remains behind as residual bottom product, which emerges through line 7.

The azeotropic vapor mixture is condensed in condenser 8, and the condensate enters receiving tank 9.

Isopropyl alcohol and paraffinic hydrocarbons of the boiling range involved are substantially mutually soluble. Therefore, in order to achieve a separation in tank 9, ethylene glycols or other suitable demixing agent is added to the condensate through line 10. About 40%–60% glycol by volume of the isopropyl alcohol present is normally sufficient to effect good separation. Two layers are formed, an upper hydrocarbon layer containing some of the alcohol and glycol and a lower glycol-alcohol layer containing but a relatively small amount of the hydrocarbons. The upper layer is withdrawn through line 11, and may be redistilled in a still not shown to produce hydrocarbons free from the alcohol and relatively small amounts of a hydrocarbon-alcohol azeotrope and of glycol which may be returned to the tank 9.

The lower layer from tank 9 is returned through line 3 to column 2. The toluene concentrate in line 7 contains the glycol which has been introduced through line 3 and may possibly further contain a small amount of alcohol which may have been fed through line 3 in excess of the amount required to form azeotropes with the saturated hydrocarbons going overhead. This toluene concentrate is fractionally distilled in column 13, equipped with reboiler 12. If it contains alcohol, 3 fractions are produced, a top fraction consisting predominantly of the azeotrope of the alcohol and toluene, a middle fraction comprising predominantly toluene and a bottom fraction of glycol.

The top fraction is condensed in condenser 14 situated in line 15, and the resulting condensate is accumulated in receiving tank 16. Glycol is added to the condensate through line 17 to effect demixing and to form two layers, an upper toluene layer containing some alcohol which is returned through line 18 to column 13, and a lower alcohol-glycol layer which passes through lines 19 and 3 to column 2.

It will be seen that in cases in which the solvent forms azeotropes not only with one but all of the components of the mixture to be separated, it is desirable to ration the amount of solvent introduced into the zone of azeotropical distillation so that as little as possible, if any, will find its way into the bottom product, because separation of the solvent from the latter requires much recycling and carrying much dead load on the fractionating system. If, on the other hand, the solvent does not form azeotropes with the hydrocarbon bottom product, e. g., toluene, the former is recovered from column 13 in substantially pure state and may directly be returned to column 2, no intermediate separation being necessary.

The toluene fraction produced in column 13 is withdrawn through line 20, glycol is returned to tank 9 through line 10, and, if necessary, to tank 16 through lines 10 and 17.

If substantially pure toluene is to be produced, column 13 should be replaced by two separate distillation columns to enable close fractionation. For simplicity, pumps, valves, bypasses, side strippers and other conventional equipment required to operate the described process are not shown in the drawing.

I claim as my invention:

1. In the process of separating a hydrocarbon distillate containing components of different degrees of saturation by distilling said distillate in the presence of a polar organic azeotrope-forming agent in a first distillation zone under conditions to form an overhead azeotrope vapor product relatively rich in the hydrocarbon component of highest degree of saturation and a residual bottom product relatively rich in a component of lower degree of saturation and containing a substantial portion of said azeotrope-forming agent, wherein said overhead vapors are condensed, said agent being at least partially miscible with the hydrocarbon component which goes overhead as azeotrope, the improvement comprising mixing with said overhead product an amount of an organic substance having polar substitution radicals, the ratio of said polar radicals to carbon atoms in said substance being not less than 2:3, said organic substance being substantially miscible with said agent but being substantially immiscible with the hydrocarbons passing overhead and being liquid and inert under the conditions of the process, said organic substance having a boiling temperature sufficiently higher than the boiling temperature of said azeotrope-forming agent so as to be readily separable therefrom by distillation, said amount of said organic substance being sufficient to effect substantial de-mixing of the condensed vapors to form two liquid phases, a lower phase comprising predominantly said agent and said substance and an upper hydrocarbon phase containing but a small amount of said agent, separating said phases, returning said lower phase to said distillation zone, fractionally distilling said residual bottom product in a second distillation zone to form three fractions, a first fraction consisting essentially of said organic substance, a second fraction consisting essentially of said component of lower degree of saturation, and a third fraction comprising said azeotrope-forming agent, returning said azeotrope-forming agent of said third fraction to said first distillation zone, and mixing said first fraction with further amounts of said overhead product from said first distillation zone.

2. The process of claim 1 wherein said substance has at least one —OH radical.

3. The process of claim 1 wherein said substance has at least one —NH₂ radical.

4. The process of claim 1 wherein said organic substance is a polyhydric alcohol.

5. The process of claim 1 wherein said organic substance is an amino alcohol.

6. The process of claim 1 wherein said organic substance is an alcohol ether.

7. The process of claim 1 wherein said substance has a boiling temperature at least 50° C. higher than the boiling temperature of said agent and of the component forming the overhead product.

RICHARD M. DEANESLY.